United States Patent [19]

Defrancq

[11] 4,443,144
[45] Apr. 17, 1984

[54] LOCKING PIN FOR A SPINDLE OR SIMILAR ELEMENT, MORE ESPECIALLY FOR AGRICULTURAL EQUIPMENT

[76] Inventor: Hubert Defrancq, 7, rue Guillaume Apollinaire, 51100 Reims, France

[21] Appl. No.: 330,804

[22] Filed: Dec. 15, 1981

[30] Foreign Application Priority Data

Dec. 17, 1980 [FR] France .............................. 80 26810
Mar. 6, 1981 [FR] France .............................. 81 04555

[51] Int. Cl.³ .......................................... F16B 21/00
[52] U.S. Cl. ................................... 411/351; 403/155; 403/379; 411/511
[58] Field of Search ............... 411/337, 340, 341, 347, 411/356, 511, 513, 516, 351, 357; 24/201 LP; 403/316, 379, 155, 154, 324

[56] References Cited

U.S. PATENT DOCUMENTS

| | | |
|---|---|---|
| 2,589,482 | 3/1952 | Downey .............................. 403/379 |
| 2,759,388 | 8/1956 | Annis . |
| 3,132,556 | 5/1964 | Doering et al. ..................... 411/340 |
| 3,658,369 | 4/1972 | Barnes . |
| 4,036,097 | 7/1977 | Greenwood . |

FOREIGN PATENT DOCUMENTS

| | | |
|---|---|---|
| 1625300 | 7/1970 | Fed. Rep. of Germany . |
| 2208471 | 6/1974 | France . |
| 2400138 | 8/1977 | France . |

*Primary Examiner*—Thomas J. Holko
*Assistant Examiner*—Thomas J. Dubnicka
*Attorney, Agent, or Firm*—Fleit, Jacobson, Cohn & Price

[57] ABSTRACT

The invention provides a locking pin (G) comprising a loop (B) and means (R) for pivoting the loop on the locking pin so that said loop (B) may be brought back to surround the spindle (A) in which the locking pin is engaged so as to oppose removal of said locking pin. The pivoting means (R) comprise a mobile bearing (6) supported by two substantially parallel arms (8, 9), the assembly being such that in a "high" position the arms extend on a side which moves the bearing (6) to a maximum away from the opposite end (e) of the locking pin, whereas in a "low" position, said arms (8, 9) have rotated with respect to the "high" position. The locking pin may pass through the loop when the arms are in the "low" position but cannot pass through the loop when the arms are in the "high" position.

14 Claims, 13 Drawing Figures

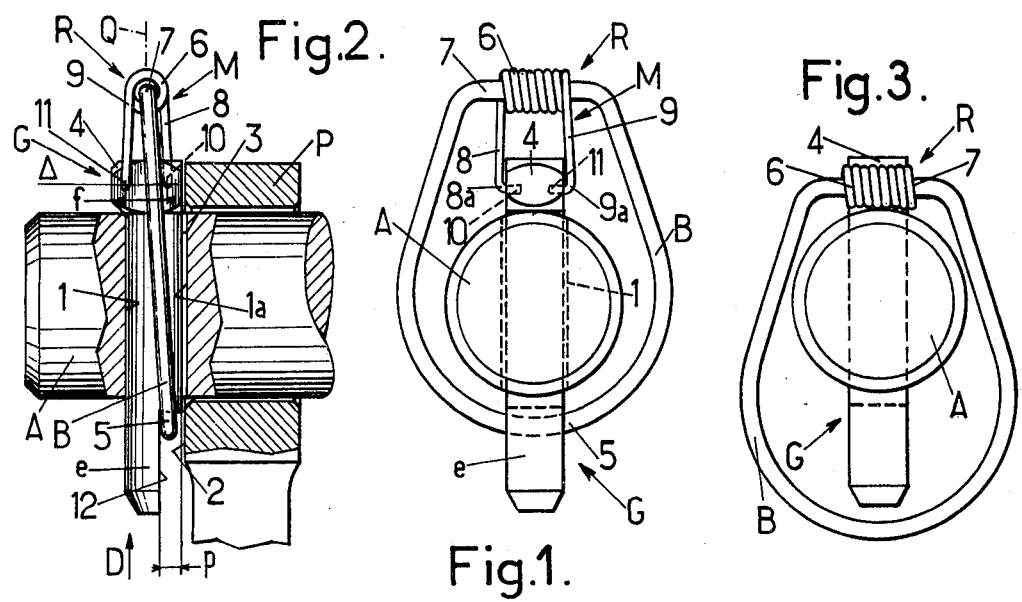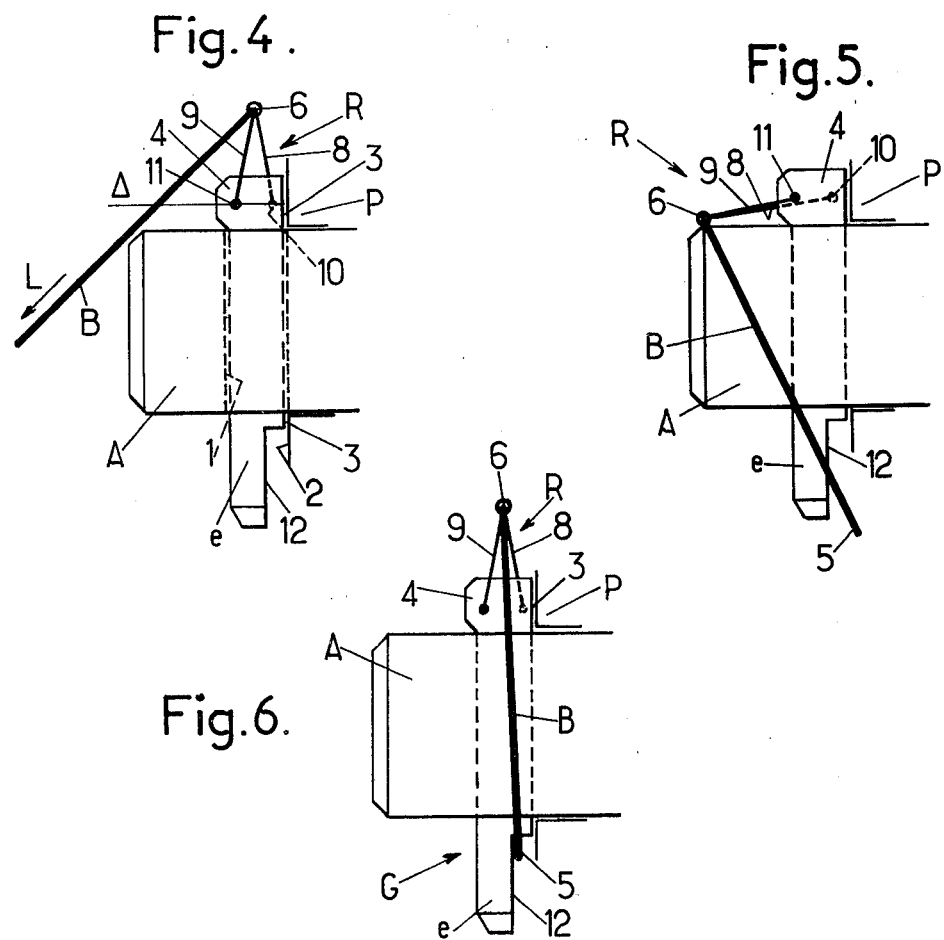

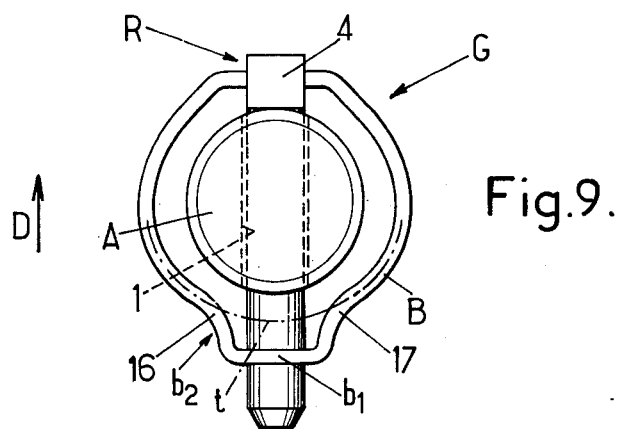
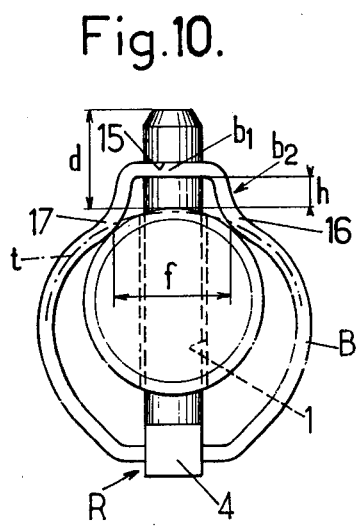
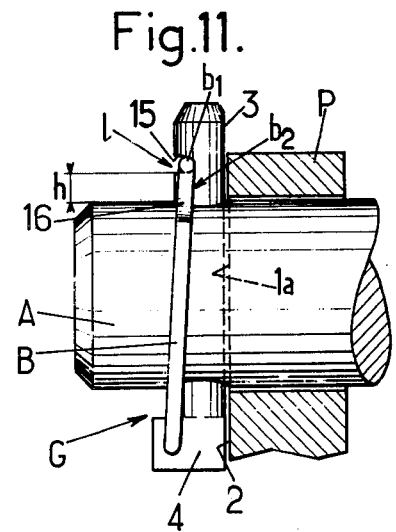
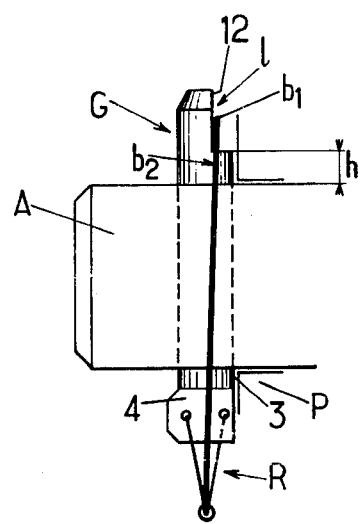

LOCKING PIN FOR A SPINDLE OR SIMILAR ELEMENT, MORE ESPECIALLY FOR AGRICULTURAL EQUIPMENT

The invention relates to a locking pin for a spindle, or similar element, of the kind which are equipped with a loop and means for pivoting this loop on the pin, so that said loop may be brought back in order to surround the spindle, or similar element, in which the pin is engaged, so as to prevent removal of said pin.

According to a first aspect, the invention relates to locking pins of the kind in question in which the means for pivoting the loop are arranged so as to be able to assume at least two positions, namely a first position or "low" position such that the pin may pass through said loop and a second position or "high" position such that the pin may not pass through the loop, the end of the locking pin opposite the pivoting means coming then into abutment against a part of the loop, said pivoting means comprising a mobile bearing capable of being placed at least in two said positions, in which bearing is engaged a pivot pin integral with the loop.

U.S. Pat. No. 2,759,388 shows a locking pin of this type in which the pivoting means comprise a bearing for pivoting the loop situated in a head in the form of a cylindrical block, covering one end of the pin and able to slide along the axis of this pin. This head is subjected to the action of a spring which surrounds a part of the locking pin. This construction is relatively complicated and cumbersome.

One of the aims of the invention is to make the pins of this kind such that they are simpler to manufacture, are more compact and have increased strength.

According to the first aspect of the invention, a locking pin of the previously-defined kind, in which the means for pivoting the loop are arranged so as to be able to assume at least two positions, namely a first position in which the pin may pass through said loop and a second position in which the pin may not pass through this loop, the end of the pin opposite the pivoting means coming then into abutment against a part of the loop, said pivoting means comprising a mobile bearing capable of being placed at least in the two said positions, in which bearing is engaged a pivot pin integral with the loop, is characterized by the fact that the bearing is supported by two substantially parallel arms, the assembly being such that for the second position or "high" position the arms extend on one side which moves the bearing to a maximum away from the opposite end of the locking pin, whereas for the first position or "low" position, said arms have rotated with respect to the "high" position.

Advantageously, the two arms supporting the bearing are pivoted on the locking pin.

Preferably, the two arms extend, for the second position, or "high" position, substantially in the longitudinal direction of the pin.

Both arms may be pivoted to the locking pin in housings offset in a plane substantially orthogonal to a plane equidistant from the two arms when they occupy the "high" position so that holding means are formed by the combination of this offset of the housings and the resilience of the arms.

The bearing may be formed by coiling a wire into turns placed side by side, both arms being integral with the bearing and being formed by two rectangular extensions of the wire at both ends of the bearing.

According to another possibility, the two arms supporting the bearing are anchored at one of their ends to the locking pin, these arms being deformable under flexion so as to allow movement of the bearing between the "low" position and the "high" position, said arms further constituting the means for holding the bearing in the "high" position because of their resilience under flexion.

In a second aspect, the invention aims at providing a locking pin of the above-defined kind whose resistance to shearing, generated by the axial stopping forces, is not substantially modified, even if the end of the locking pin provided with pivoting means moves away from the spindle on which the locking pin is mounted, more especially following rotation of this spindle.

According to this second aspect of the invention, a locking pin for a spindle or similar element of the above-defined kind is characterized by the fact that the part of the loop, distant from the pivoting means, has a form such that when the locking pin is engaged in the spindle and when the loop has been brought back about this spindle, said part of the loop distant from the pivoting means is adapted to come into abutment against the spindle and to maintain the end of the locking pin, distant from the pivoting means, at a sufficient distance from the external surface of the spindle, should the locking pin move in its longitudinal direction, in a direction which moves the pivoting means away from the spindle.

The locking pin comprises advantageously in the vicinity of its end distant from the pivoting means, a recess or notch adapted to receive a zone of the loop when it is brought back; the shape of said part of the loop distant from the pivoting means is such that abutment of this part of the loop against the spindle allows the recess to be maintained at a sufficient distance (outwardly) from the surface of the spindle, during possible movement of the locking pin in its longitudinal direction.

Preferably, the shape of said part of the locking pin is such that the edge of the recess the nearest the spindle is held at a distance of about 5 millimeters from the surface of the spindle.

Said part of the loop distant from the pivoting means may form a sort of projection, extending outwardly with respect to the general line of the mean contour of the loop, this projection being joined to the loop by two arcs having their concavity turned outwardly, these arcs being adapted to bear, with their convex part, against the surface of the spindle.

According to another possibility, said part of the loop distant from the pivoting means forms an acute angle, more especially with a rounded apex, and is connected, by means of two arcs having their convexity turned outwardly, to two rectilinear parts of the loop, parallel to the geometrical axis of the locking pin.

A field of application which is more particularly interesting, but not limiting, of the locking pins of the invention is that of large-section locking pins used for agricultural equipment.

The invention consists, apart from the arrangements discussed above, of certain other arrangements which will be more explicitly discussed hereafter in connection with particular embodiments described with reference to the accompanying drawings, but which are in no wise limiting.

FIG. 1, of these drawings, is an elevational view of a locking pin in accordance with the invention, engaged in a spindle, with the means for pivoting the loop in the "high" position.

FIG. 2 is a right-hand view with respect to FIG. 1, with a part shown in section.

FIG. 3 is an elevational view of the locking pin with the pivoting means in the "low" position.

FIGS. 4 to 6 illustrate schematically the positioning of the locking pin, seen from the right-hand side with respect to FIG. 1.

FIG. 9 shows, similarly to FIG. 1, a locking pin engaged in a spindle, constructed in accordance with the second aspect of the invention.

FIG. 10 is an elevational view in which the spindle has rotated by half a revolution with respect to FIG. 9.

FIG. 11 is a view seen from the right-hand side with respect to FIG. 10, with a part shown in section.

FIG. 12 is a schematical view of another embodiment of the locking pin.

Figure 13:
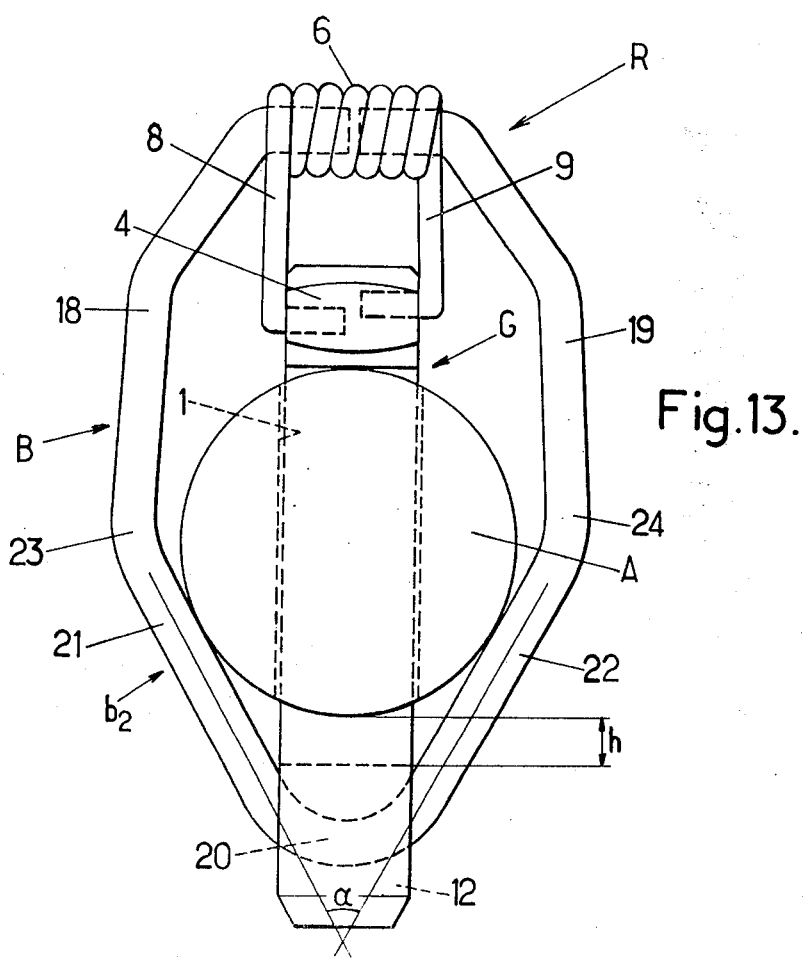

FIG. 13, finally, is an enlarged view, similar to FIG. 9, of another embodiment.

Referring to the drawings, particularly to FIGS. 1 to 3, a locking pin G is shown for a spindle A, or a shaft or similar element. Locking pin G is intended, in a conventional way, to lock spindle A with respect to a part P (FIG. 2) comprising a bore through which passes spindle A. This spindle comprises a diametrical hole 1 provided so that, when spindle A passes through part P and occupies the position normally provided, hole 1 is situated entirely externally of part P, the generatrix 1a of this hole, adjacent part P, being situated in the phase of face 2 or slightly outwardly of this plane.

Locking pin G has a general cylindrical shape of revolution but presents a flat face 3 intended to come close to or engage with the transverse face 2 of part P, so as to provide easier insertion.

Locking pin G is equipped with a loop B formed more especially from steel wire, and means R for pivoting this loop, which may be brought back after positioning of locking pin G, about spindle A. Thus it can be seen that loop B, cooperating with spindle A, opposes removal of locking pin G in direction D shown by an arrow in FIG. 2.

It should be noted that locking pin G comprises a head 4 of larger section to which loop B is pivoted. This head 4 prevents the locking pin G from being driven too far into the hole in the opposite direction to D.

The pivoting means R are arranged so as to be able to assume at least two positions, namely a first position or "low" position, shown in FIG. 3, in which the locking pin G may pass through loop B and a second position or "high" position shown in FIGS. 1 and 2 in which locking pin G cannot pass through loop B and comes into abutment with its end e against the part 5 of the loop opposite the pivoting means.

It should be noted that, for the sake of simplicity, it has been assumed that the pivoting means may assume at least two positions such as previously defined. However, the movement of the pivoting means between these two positions may take place generally in a continuous manner so that the pivoting means assume a succession of different positions. The expression "high" position may then cover a number of positions in which the locking pin may not pass through the loop, whereas the expression "low" position includes a number of positions in which the locking pin may pass through the loop.

According to the embodiment of FIGS. 1 to 3, the pivoting means R comprise a mobile bearing 6 in which is engaged a pivot pin 7 integral with the loop, the inner diameter of bearing 6 being substantially equal to that of pin 7. The bearing 6 is formed by a sleeve obtained by coiling a wire, more especially a spring-steel wire, into turns placed side by side; pin 7 is formed by the two adjacent ends, bent into alignment with each other, of loop B; these ends are engaged in bearing 6.

This bearing is supported by two substantially parallel arms 8, 9 pivoting on the head 4 of the locking pin.

Both arms 8, 9 are integral with bearing 6 and form rectilinear extensions of the two end turns of this bearing. Ends 8a, 9a of the arms are bent substantially at right angles and are engaged in housings 10, 11 provided on each side of head 4. These housings 10, 11 are offset with respect to one another by a distance f, as can be seen in FIG. 2, in a plane Δ orthogonal to the plane Q equidistant from the two arms 8, 9 when they occupy their "high" position. The two housings 10, 11 have their axes parallel to the intersection of planes Q and Δ.

The two arms 8, 9 present a resilience under flexion and, because of the offsetting of housings 10, 11, exert a resilient return force urging bearing 6 to the "high" position shown in FIG. 1.

When bearing 6 is rotated anticlockwise, as viewed in FIG. 2, arms 8 and 9 are deformed and exert a return force urging towards the "high" position, as long as the mean plane of arms 8, 9 has not passed through the plane Δ passing through the axes of housings 10 and 11.

When the mean plane of arms 8, 9 passes through the plane of the axes of housings 10, 11, the torque generated by the resilient deformation of arms 8, 9 tends to rotate the arms and the bearing 6 downwards in an anticlockwise direction, still as viewed in FIG. 2.

The combination of the offsetting of housings 10, 11 and the resilience of the assembly formed by arms 8, 9 and bearing 6 constitute means M for holding this bearing 6 in its "high" position.

Locking pin G comprises, at its end e opposite that provided with pivoting means, a recess 12 (or notch) clearly visible in FIG. 2, and situated on face 3 side so as to come in the vicinity of the transverse face of part P. This housing 12 is adapted to receive the part of loop 5, while serving as a stop therefor, so that said part 5 does not project from face 3. This notch 12 could be replaced by a simple bevel.

Loop 7 is generally an open loop both ends of which are practically joining and engaged inside bearing 6. It is however possible to form loop 7 as a closed loop for example by welding the adjacent ends after their insertion in bearing 6. The shape of loop 7 may be circular or substantially elliptic or oval with its large axis orientated in the longitudinal direction of locking pin G.

With such an arrangement, the positioning and removal of the locking pin takes place in the following way described especially with reference to FIGS. 4 to 6.

With pivoting means R in the "high" position (or second position), as shown in FIG. 4, the pin is inserted in hole 1, spindle A having been suitably positioned with respect to part P. The flat face 3 of the locking pin is situated adjacent the transverse face 2. The locking pin G is driven in until it abuts with its head 4 against the surface of spindle A. The end of the locking pin G opposite head 4 then projects out of hole 1, on the opposite side, housing 12 being situated entirely outwardly of spindle A.

Then a moment of rotation is exerted on arms 8 and 9 which, as viewed in FIG. 4, results in causing arms 8 and 9 to rotate as well as bearing 6 in an anticlockwise direction about the axes of housings 10 and 11. This moment of rotation may be obtained, for example, by exerting a thrust on the bearing 6 in a direction L sloping downwardly with respect to plane Δ. This bearing 6 has advantageously a shape offering sufficient surface for exerting this thrust manually.

As previously explained, when arms 8 and 9 have rotated by about 90° with respect to the "high" position of FIG. 2, the mean plane of these arms crosses the plane Δ passing through the axes of housings 10 and 11; arms 8 and 9 deformed resiliently exert a force rotating bearing 6, viewed in FIGS. 4 and 5, downwards in a clockwise direction. Bearing 6 will be stopped by abutment against spindle A, which corresponds to the "low" position of the pivoting means (FIG. 5).

It should be noted, in this connection, that the dimensions of the locking pin, of loop B and of arms 8 and 9 are generally chosen so that the locking pin G may pass through loop B as soon as arms 8 and 9 have rotated by at least 90° with respect to the "high" position shown in FIG. 2. It may then be considered that the first position or "low" position is formed by any position of the pivoting means offset by at least 90° with respect to the "high" position of FIG. 2.

The position of the pivoting means thus corresponds to that shown in FIG. 5. It is then possible to bring loop B back by causing it to rotate, as viewed in FIG. 5, in an anticlockwise direction about bearing 6. Loop B then surrounds spindle A; furthermore, locking pin G may pass through loop B so that part 5 of this loop opposite the pivoting means may be brought, as shown in FIG. 5, beyond the end e of the locking pin projecting on the side of spindle A opposite head 4.

Then the pivoting means are brought back to the "high" position, as shown in FIG. 6. The part of loop 5 which has passed to the other side of locking pin G rises up along pin G in recess 12. It can be seen that the end e of the locking pin forms a stop opposing opening of loop B; such opening, as viewed in FIG. 6, requires a rotational movement of loop B about bearing 6, in a clockwise direction.

Locking is effected under good conditions, since bearing 6 will remain in the "high" position because of the action of the holding means. If loop B is caught by an obstacle, locking pin G opposes opening of the loop.

For removing locking pin G, it will be necessary to exert on bearing 6 and on arms 8 and 9 a rotational moment in an anticlockwise direction, as viewed in FIG. 6, so that arms 8 and 9 and bearing 6 take up the position shown in FIG. 5. It is then possible to cause locking pin G to pass again through loop B and to free the part 5 of this loop from end e. The opening movement of the loop is continued so that that this loop no longer surrounds spindle A. It is then possible to remove locking pin G by pulling in direction D.

It should be noted that preferably the depth p (FIG. 2) of recess 12, i.e. the dimension of this recess in the direction parallel to the geometrical axis of spindle A, is at least equal to the diameter of the wire forming loop B so that this loop does not project from the face 3 when the part 5 is engaged in recess 12.

Figure 8:
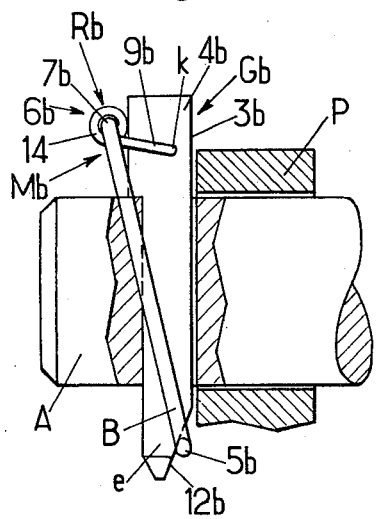
FIG. 8 is a view seen from the right-hand side with respect to FIG. 7.
Figure 7:
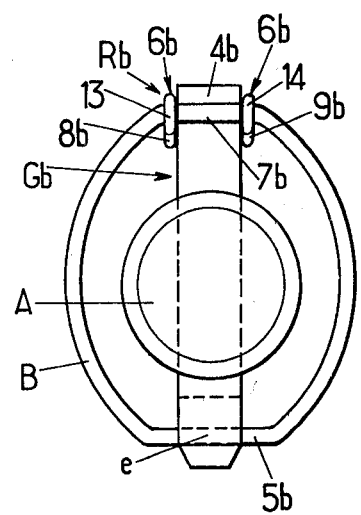
FIG. 7 shows, similarly to FIG. 1, another embodiment of the locking pin.

With reference to FIGS. 7 and 8, there is shown a variation of the locking pin $G_b$.

The parts of this locking pin identical or playing similar roles to the parts already described in FIGS. 1 to 3 are designated by the same references possibly followed by the letter b; the description of these parts will not be given again or will be treated very briefly.

The two arms 8b, 9b carrying the bearing 6b are anchored, at one of their ends designated by k in FIG. 8, to the head 4b of the locking pin. These two arms 8b, 9b enclose the head of the locking pin. Anchoring of their ends to the locking pin may be provided by welding.

In the embodiment of FIGS. 7 and 8, the two arms 8b, 9b are not connected to each other; the bearing 6b is formed by the assembly of two loops 13, 14 spaced apart from each other and formed by winding the end of arms 8b, 9b opposite that anchored to the locking pin. The pivot pin 7b of loop B passes through these two loops 13, 14 as can be seen in FIG. 7.

According to a variation, both arms 8b, 9b could be connected together by a transverse branch extending between the loops 13, 14, the assembly being obtained from a single wire suitably bent and wound.

Arms 8b, 9b are deformable under flexion, so as to allow movement of the bearing, i.e. of loops 13, 14 between the "high" position shown in FIG. 8 and the "low" position (not shown). This "low" position corresponds to rotation of loops 13, 14 in an anticlockwise direction about the end k, as viewed in FIG. 8.

It can be seen that in the "high" position, arms 8b, 9b are situated slightly above the plane perpendicular to the axis of the locking pin, passing through end k.

In the "low" position, arms 8b, 9b extend below this plane so that the end 5b of loop B is completely disengaged from locking pin $G_b$ which may pass through this loop. Arms 8b, 9b, because of their resilience under flexion, form the means Mb for holding the bearing in the "high" position. The recess 12b provided for receiving part 5b of the loop is formed by a simple bevel, as shown in FIG. 8.

The positioning, the locking, the unlocking and removal of locking pin $G_b$ in FIGS. 7 and 8 take place in a way similar to that explained with reference to FIGS. 1 to 6.

Referring to FIGS. 9 to 13, a locking pin G can be seen according to the second aspect of the invention. The parts of this locking pin similar to parts already described are designated by the same references without their description being given again.

Generally, the arrangement of the pivoting means R is such that a force is exerted on loop B to maintain it in the position turned back about spindle A, shown in FIG. 1.

Locking pin G comprises, towards its end distant from the pivoting means R, a recess or notch 1 adapted to receive a zone b1 of loop B when it is brought back.

In the embodiment of FIGS. 9 to 11, recess 1 is formed by a notch 15 situated on the side of locking pin G opposite the flat face 3, i.e. on the side distant from face 2 of part P. In this embodiment, the pivoting means R are advantageously disposed so as to generate deformation of loop B so as to produce, in this loop, a moment of rotation tending to apply zone b1 in notch 15.

In the embodiment of FIG. 12, recess 1 is formed by the indentation 15 provided in the flat face of the pin, adjacent face 2 of part P; the pivoting means are then arranged so as to allow loop B to pass over locking pin G, as provided in FIGS. 1 to 8.

FIG. 9 illustrates the normal position for introducing locking pin G into spindle A, i.e. the axis of hole 1 is generally vertical and the locking pin is inserted so that the head 4 is above spindle A and bears against this spindle.

According to this second aspect of the invention, part b2 of loop B, distant from the pivoting means R, has a shape such that when locking pin G is engaged in spindle A and when loop B has been brought back about this spindle, said part b2 of the loop is adapted to abut against the spindle and to hold the end of locking pin G, opposite the pivoting means R, at a sufficient distance d from the outer surface of spindle A, should locking pin G slidingly move in its longitudinal direction.

More precisely, in the case where locking pin G comprises a recess 1, said part b2 of the loop is adapted, by abuting against spindle A, to hold the edge of recess 1 the nearest to spindle A at a sufficient distance h (see FIGS. 10, 11 and 12) from this spindle A. By sufficient distance h is meant a distance such that the shearing stresses generated by the axial locking forces exerted on locking pin G coming into abutment against face 2 are small at the level of the section of locking pin G weakened by the presence of recess 1. It may be indicated that the distance h is of the order of 5 mm at least.

Should spindle A rotate half a revolution with respect to the position which it occupies in FIG. 9, locking pin G would find itself with head 4 under spindle A as shown in FIG. 10; in this position, locking pin G would tend to move downwardly; it can be immediately seen that part b2, coming into engagement with spindle A, retains locking pin G so that recess 1 remains sufficiently distant outwardly from spindle A. The result is that the shearing forces to which locking pin G may be subjected, because of its axial locking role, will not occur at the level of the reduced section zones of locking pin G. The same remark applies for the embodiment of FIG. 12 in which loop B comprises a part b2 similar to that of FIGS. 9 to 11.

This part b2 forms a sort of projection, extending outwardly with respect to the extension t of the mean contour of loop B. This projection is connected to the mean contour of loop B by means of two arcs 16, 17 whose concavity is turned outwardly. These arcs 16, 17 are adapted to come into abutment against spindle A by their convex portion, as can be seen in FIG. 10.

Arcs 16 and 17 are connected to zone b1, which may be substantially rectilinear, which is intended to engage in recess 1.

Distance f (FIG. 10), in a direction orthogonal to the longitudinal direction of the locking pin, between the contact zones of arcs 16 and 17 with spindle A is chosen so as to allow positioning of zone b1 in recess 1, without difficulty.

The part b2 is preferably symmetrical or substantially symmetrical with respect to the plane passing through the longitudinal axis of locking pin G and the geometrical axis of spindle A.

With the invention, the working conditions of locking pin G, particularly when spindle A rotates by half a revolution with respect to the normal position shown in FIG. 9, are distinctly improved and avoid premature damage to this locking pin.

It would not be the same should the mean contour of loop B extend along line t. In fact, in the positions shown in FIGS. 10 to 12, locking pin G would assume a position in which head 4 would be lower; recess 1 and so the reduced section zone of locking pin G would be substantially at the level of the abutment zone against face 2, in the vicinity of the outer surface of spindle A.

By referring to FIG. 13, a variation can be seen in which the parts playing identical or similar roles to parts already described in FIGS. 9 to 12 are designated by the same references, without description thereof being made again in detail.

Loop B of FIG. 13 comprises two rectilinear portions 18, 19 parallel to the geometric axis of the locking pin; said part b2 of the loop distant from the pivoting means R forms an acute angle α, particularly with a rounded apex 20, when the recess 1 is formed by an indentation 12 similar to that in FIG. 12. The rectilinear sides 21, 22 of this acute angle are connected, to said parts 8, 9, by means of two arcs 23, 24 having their convexity turned outwardly.

The shape of loop B is such that the engagement of sides 21, 22 with spindle A holds the edge of indentation 12 the nearest to the spindle at a sufficient distance h from the surface of this spindle.

The pivoting means R shown in FIG. 13 are arranged so as to be able to assume a "low" position, in which the locking pin may pass through loop B and a "high" position in which the locking pin cannot pass through the loop. FIG. 13 shows the pivoting means R in the "high" position.

Said part b2 of the loop distant from the pivoting means R is arranged so as to come into contact, or substantially into contact with shaft 2, whereas the head 4 of the locking pin is itself in abutment against this shaft, means R being in the "high" position. The variation of FIG. 13 presents then the advantages already emphasized previously while ensuring complete locking of the locking pin G in its axial direction.

It is clear from the preceding explanations that loop B may have different shapes; it is sufficient that these shapes comply with the previously defined conditions.

Whatever the embodiment, the locking pin of the invention is simple to manufacture and positioning thereof as well as removal thereof remain easy. Locking of this locking pin is efficiently ensured. Its efficiency is not altered by possible wear due to repeated use.

I claim:

1. A locking pin for a spindle, or similar element, equipped with a loop and means for pivoting the loop on the locking pin so that said loop may be brought back to surround the spindle, or similar element, in which the locking pin is engaged, so as to oppose removal of said locking pin, the means for pivoting the loop being arranged so as to be able to assume at least two positions namely a first position or "low" position in which the locking pin may pass through said loop and a second position or "high" position in which the locking pin may not pass through the loop, the end of the locking pin opposite the pivoting means then coming into abutment against a portion of the loop, said pivoting means comprising a mobile bearing capable of being placed at least in said two positions, in which bearing is engaged a pivot pin integral with the loop, characterized by the fact that the bearing is supported by two substantially parallel arms, the assembly being such that in the second position or "high" position the arms extend on one side which moves the bearing to a maximum away from the opposite end of the locking pin, whereas in the first "low" position, said arms have rotated with respect to the "high" position.

2. The locking pin according to claim 1, characterized by the fact that the two arms supporting the bearing are pivoted to the locking pin.

3. The locking pin according to claim 2, characterized by the fact that the two arms extend in the second position or "high" position, substantially in the longitudinal direction of the locking pin.

4. The locking pin according to claim 3, characterized by the fact that the two arms are pivoted to the locking pin in housings offset in a plane substantially orthogonal to a plane equidistant from the two arms when they occupy the "high" position so that the holding means are formed by the combination of this offsetting of the housings and the resilience of the arms.

5. The locking pin according to claim 4, characterized by the fact that the bearing is formed by coiling a wire into turns placed side by side, the two arms being integral with the bearing and being formed by two rectilinear extensions of the wire at both ends of the bearing.

6. The locking pin according to claim 5, characterized by the fact that in the first position or "low" position, the arms have rotated by about 90° or more with respect to the "high" position.

7. The locking pin according to claim 6, characterized by the fact that it comprises, at its end opposite that provided with the pivoting means, a recess or notch adapted to serve as a stop and as a housing for a part of said loop when the locking pin has passed through this loop and when the pivoting means have been brought back to their "high" position.

8. The locking pin according to claim 1, characterized by the fact that the two arms supporting the bearing are anchored at one of their ends, particularly by welding, to the locking pin, these arms being deformable under flexion so as to allow movement of the bearing between the "low" position and the "high" position, said arms forming furthermore the means for holding the bearing in the "high" position because of their resilience under flexion.

9. A locking pin for a spindle, or similar element, equipped with a loop and means for pivoting the loop on the locking pin so that said loop may be brought back to surround the spindle, or similar element, in which the locking pin is engaged, so as to oppose removal of said locking pin, the means for pivoting the loop being arranged so as to be able to assume at least two position, namely a first position or "low" position in which the locking pin may pass through said loop and a second position or "high" position in which the locking pin cannot pass through the loop, the end of the locking pin opposite the pivoting means coming then into abutment against a portion of the loop, said pivoting means comprising a mobile bearing capable of being placed at least in said two positions, in which bearing is engaged a pivot pin integral with the loop, characterized by the fact that the bearing is supported by two substantially parallel arms, the assembly being such that in the second position or "high" position the arms extend on one side which moves the bearing to a maximum away from the opposite end of the locking pin, whereas in the first "low" position, said arms have rotated with respect to the "high" position, and that the part of the loop distant from the pivoting means, has a shape such that, when the locking pin is engaged in the spindle and when the loop has been brought back about this spindle, said part of the loop distant from the pivoting means is adapted to come into abutment against the spindle and to hold the end of the locking pin, distant from the pivoting means, at a sufficient distance from the outer surface of the spindle, should the locking pin move in its longitudinal direction, in a direction which moves the pivoting means away from the spindle.

10. The locking pin according to claim 9, comprising, towards its end distant from the pivoting means, a recess or notch adapted to receive a zone of the loop when it is brought back, characterized by the fact that the shape of said part of the loop distant from the pivoting means is such that the abutment of this part of the loop against the spindle allows the recess to be held at a sufficient distance, towards the outside, from the surface of the spindle, during possible movement of the locking pin in its longitudinal direction.

11. The locking pin according to claim 10, characterized by the fact that the shape of said part of the loop is such that the edge of the recess the nearest to the spindle is held at a distance of at least five millimeters from the surface of the spindle.

12. The locking pin according to any one of claim 9, characterized by the fact that the part of the loop distant from the pivoting means is symmetrical or substantially symmetrical with respect to the plane passing through the longitudinal axis of the locking pin and the geometric axis of the spindle.

13. The locking pin according to any one of claim 9, characterized by the fact that the part of the loop distant from the pivoting means forms an acute angle and is connected by two arcs whose convexity is turned outwardly, to two rectilinear parts of the loop parallel to the geometric axis of the locking pin.

14. The locking pin according to claim 13 and wherein the means for pivoting the loop are arranged so as to be able to assume a "low" position in which the locking pin may pass through the loop and a "high" position in which the locking pin cannot pass through the loop, characterized by the fact that said part of the loop distant from the pivoting means is arranged so as to come into contact or substantially into contact with the spindle whereas the head of the locking pin itself bears against the spindle.

* * * * *